INVENTOR
Gérard Chamayou

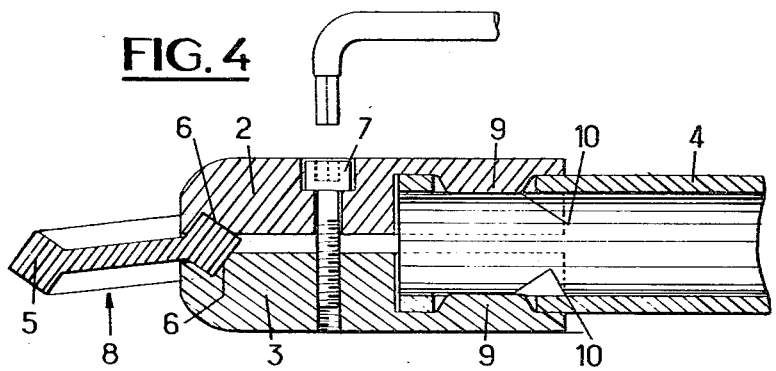
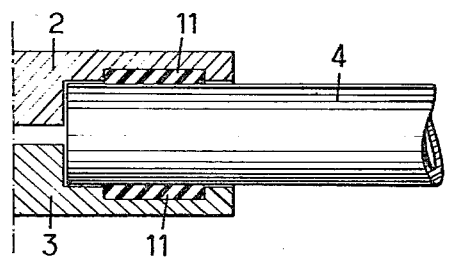
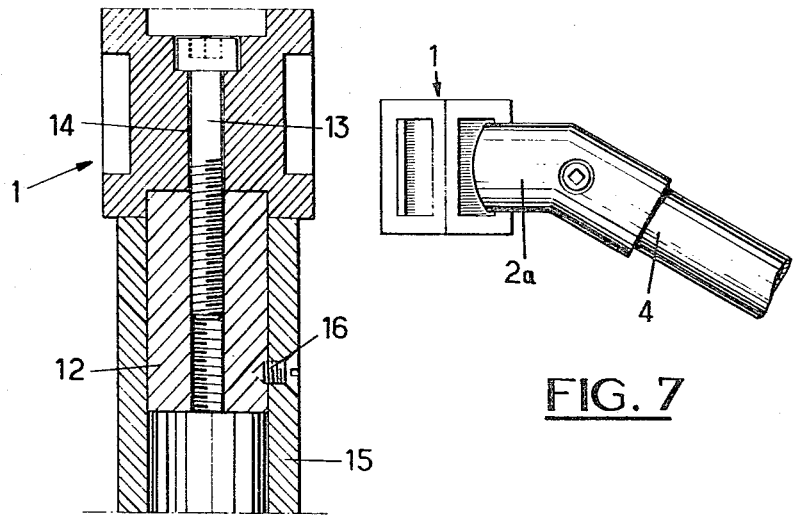

United States Patent Office 3,356,394
Patented Dec. 5, 1967

3,356,394
MEANS FOR TUBE ASSEMBLAGE AND
ANALOGOUS APPARATUS
Gerard Chamayou, Paris, France, assignor to Societe Anonyme dite: Vallourec, Paris, France, a company of France
Filed June 30, 1965, Ser. No. 468,479
Claims priority, application France, July 3, 1964, 980,585, Patent 1,418,868
6 Claims. (Cl. 287—54)

ABSTRACT OF THE DISCLOSURE

Demountable means for assembling a plurality of tubes into a tripod or the like, said means comprising a core portion having a plurality of plane surfaces having their adjacent edges bridged by abutments extending along said edges and having opposed corners parallel to the edges, together with a pair of jaws for each tube, one end of each pair being adapted to grip a tube while the other end of that pair is adapted to grip one of the abutments.

---

It is often necessary to provide a structural assembly wherein a plurality of tubes extend from a common point in any desired angular direction.

The assembly devices generally used for this purpose require a welding of the tubes to a joint therefor. This has the disadvantage of providing structures that cannot be disconnected and there are, moreover, many instances wherein the welding operations are subject to difficulties.

It is known, of course, to provide assembly devices for tubes that are purely mechanical and wherein the tubes and the like members are held together, in most cases, by the use of bolts. However, such mechanical devices are not entirely satisfactory since it generally requires a time-consuming operation of adapting or shaping the end portions of the tubes to be assembled. Moreover, the mechanical assemblies known in the art are often unesthetic and they are also subject to difficulties from an operational point of view.

The present invention is directed to an assembly device which is particularly useful for metallic structures that are not required to support heavy loads, which is economical and can be quickly assembled. There is furthermore no need, except for certain particular uses, for modifications of the end portions of the tubes which are simply cut off at the desired length.

The assembly devices according to the present invention furthermore correspond to the principles established by modern taste, which permits various highly desirable uses of such devices. An example of this is the use of such devices in advertising structures.

A particular object of the present invention is the provision of a new industrial product consisting of a multi-directional assembly device for pipes or the like tubular elements which is essentially characterized by the fact that it comprises the combination of:

(a) A plurality of pairs of jaws each having portions at one end forming sockets which telescope over the tube to be supported, whereas the other ends of said box are provided with two concave recesses that face each other, (b) A rigid core comprising a plurality of convex ridge-like structures each having a shape that corresponds to that of the aforesaid recesses provided at one end of the jaws, (c) One or more screws or analogous holding means to insure the tightening of each pair of jaws upon the tube accommodated therebetween and the core just mentioned.

According to a preferred embodiment of the invention, the convex ridges of the core and the concave recesses of the jaws, are of such structure that it is possible to control therewith, to a certain degree, the direction given to the tube with respect to the core. To this end, it is recommended to give to said ridge-like structures of the core and the recesses of the jaws, for example the form of a surface of revolution (cylinder, core, etc.).

The above-mentioned cores may be suitably provided in many different shapes according to the invention, some of which are noted below:

A cubical form with a ridge-like structure on each of its twelve edges so as to permit the tubes to extend in a dozen directions passing through the center of the cube and perpendicularly with respect to said twelve edges;

A flat polygonal form that comprises several ridges following each other in a common plane so as to permit several junctions with tubes to be located either in the same plane, or suitably inclined with respect to the plane of the core. This type of core permits, more particularly, supporting in an easy manner spherical tubular structures;

A regular tetrahedral form comprising a ridge along each of its six edges, which will permit the six tubes to extend at right angles.

In accordance with the invention, the ridges may be provided in many different forms; however, it is advantageous in most of the embodiments thereof to utilize ridge-like structures that have a square or polygonal section so as to allow a good angular adjustment of the tubes with respect to the core.

Although in most of the cases, a simple tightening of the jaws upon the tubes insures the erection of a structure having sufficient rigidity, it is possible, if desired, to increase the rigidity and the strength of the assembly as a whole by various means the purpose of which is to prevent the tubes from being loosened between the jaws.

It is possible, first of all, to place a packing between the tube and the jaws, made of rubber for example, which increases the coefficient of friction between the two pieces.

Another way is to provide the paws with protuberances which engage cavities or corresponding recesses provided in the end portions of the tubes so as to produce a locking of the jaws upon the tube. This locking, of course, can be obtained just as effectively with the aid of a key or a bolt that extends through the tube in addition to extending through the jaws.

Finally, it is possible to cement or weld one of the jaws to the tube, or even both jaws if it is desired to assemble a structure that need not be demounted.

Another feature of the invention is the fact that it affords supplemental constructions with a limited number of forms of the core, with the aid of bent jaws which are capable of placing the tubes in an angular direction different from that normally obtained with jaws that are not bent.

It is also possible, in accordance with the invention, to utilize jaws comprising a sufficient number of pieces to accommodate or secure a cluster of tubes on the same ridge of a core.

Finally, it will be evident that there may be combined, on the same core, the assembly devices of the present invention together with assembly devices of conventional type.

For a better understanding of the invention, and not as a limitation, reference is had to the description of several embodiments thereof to be read in conjunction with the annexed drawing, wherein—

FIG. 4 is a longitudinal sectional view of a tube assembled on the core of FIG. 3.

FIG. 5 is a partial cross section showing the manner in which the coefficient of friction between the tube and the jaws can be increased.

FIG. 6 shows a longitudinal sectional view of the conventional assembly of the core of FIG. 1 on a square tube.

FIG. 7 shows an elevation of a tube mounted on a cubical core by means of a pair of bent jaws.

Figure 1:
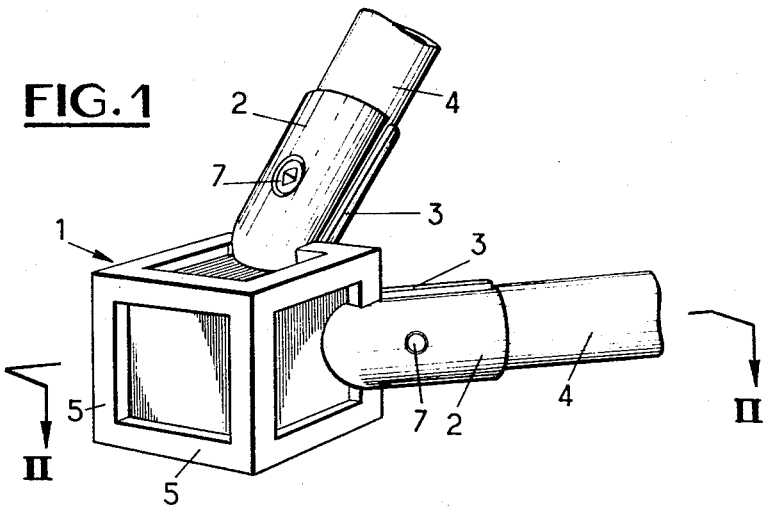
FIG. 1 is a perspective view of one embodiment of the invention comprising a cubical core.
Figure 2:
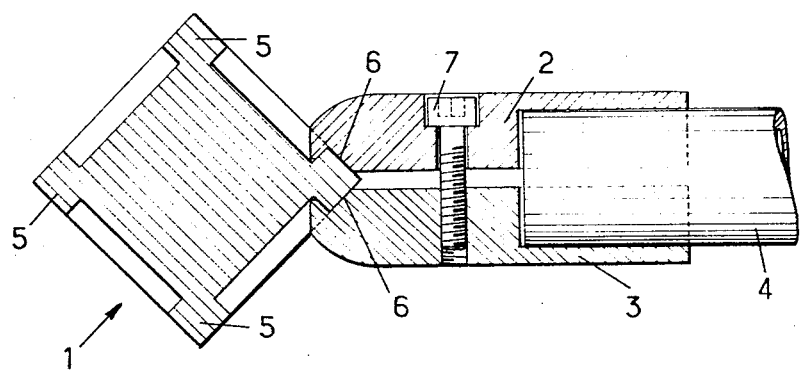
FIG. 2 is a cross section taken on the lines II—II of FIG. 1.

Referring to FIGS. 1 and 2, there is shown therein a first embodiment of the invention comprising a cubical core 1 provided at each of its edges with a ridge-like structure 5 obtained by hollowing each of the faces of the cube.

As shown, more particularly in FIG. 2, the jaws 2 and 3 that accommodate at one end thereof the tube 4 in a cylindrical housing of corresponding shape, are provided at the other end thereof with a concave groove 6 the form of which corresponds to that of the ridges 5 of cube 1.

From the foregoing, it is clear that the tightening of the screw 7 in the corresponding threaded orifice of jaw 3, forces the jaws 2 and 3 in closely abutting relation thereby joining the tube 4 to the core 1 into a strongly braced structure.

Figure 3:
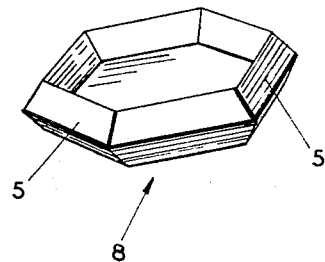
FIG. 3 shows a flat hexagonal core having six ridge-like structures in perspective.

In the case of the hexagonal core 78 shown in FIG. 3, this involves the provision of six ridges 5 disposed according to the sides of a regular hexagon, but slightly inclined with respect to the median plane of the core 8. This inclination is particularly evident in FIG. 4 where is shown in cross section the core 8 with one of its ridges is inserted in the concave grooves 6 of jaws 2 and 3.

According to the embodiment shown in FIG. 4, the jaws are provided with protuberances 9 which engage the corresponding orifices 10 of tube 4, in such a way that upon tightening the screw 7 the tube 4 is locked between the jaws 2 and 3.

FIG. 5 shows another form of the portion of the jaws that receive tube 4 and by means of which it is possible to insure a greater coefficient of friction between the jaws and the tube. To such end, a packing 11 of rubber for example, is inserted into the housing provided in the jaws which permits locking the tube between the jaws in an even firmer manner.

It is also possible to increase the coefficient of friction by applying to the effective parts of the jaws a layer of a material that possesses a high coefficient of friction.

In FIG. 6 there is shown how it is possible to secure a cubical core 1 according to the invention to a square tube 15 for example, without the use of the present assembly device. In that case a screw 13 engages an orifice 14 provided in core 1 in order to lock against the latter a square insert 12 on which is assembled the square tube 15 and retained thereon by pointed screw 16. The upper and lateral ridges of core 1 may then receive the assembly devices according to the present invention.

In FIG. 7 it is shown how the bent jaws 2a can be used to secure the tube 4 upon the cubical core 1.

Figure 8:
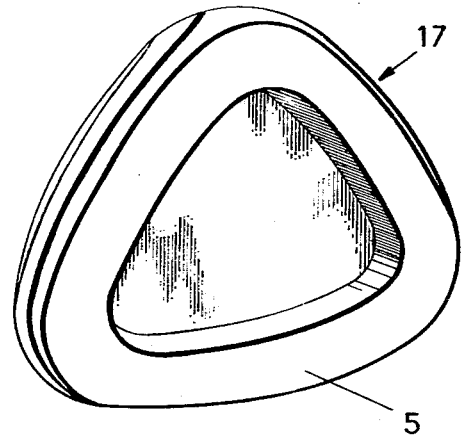
FIG. 8 is a perspective view of a core having an equilateral tetrahedral form.
Figure 9:
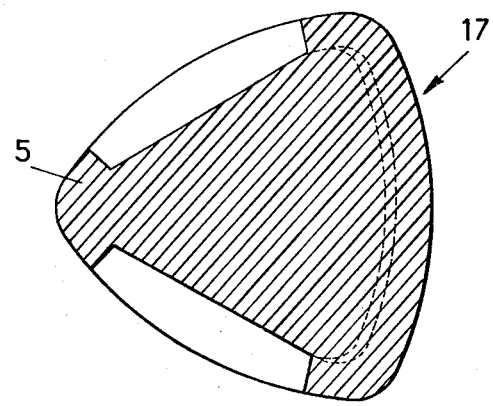
FIG. 9 is a sectional view taken in a plane including one edge of the tetrahedron shown in FIG. 8 and bisecting its opposite edge.

In FIGS. 8 and 9 there is shown a core having a curvilinear tetrahedral form which permits the assembly of six tubes. Referring to FIG. 9, there is clearly shown therein the section of the ridge-like structure 5 of the core, the groove formed between jaws 2 and 3 having, in accordance with the present invention, an exactly corresponding form.

There is also clearly shown in FIG. 9 the curvature of the edge 17 which permits, in the case of using jaws that are not as large as the effective length of this edge, to vary within certain limits the direction of the tube with respect to the core by changing the position of the jaws along said edge 17.

It is to be understood that the various embodiments described are by way of illustration and example only, and are not to be taken by way of limitation, and that modifications may be made therein without departing from the principles or scope of the invention.

More particularly, it is evident that the assembly device according to the invention permits not only the structural assembly of tubes and rods but also of any disconnectible elements of different length, all that is necessary is to modify the shape of the jaws that have been described, so as to adapt them to structures of any kind desired.

From the foregoing, it will be evident that it is possible to assemble tubes having different diameters on a common core, either by the use of several types of jaws or by providing a tapered section of smaller diameter at the ends portion of the tube of larger diameter, or inversely.

What is claimed is:
1. A device for connecting elongated members which comprises in combination
   a plurality of pairs of opposed jaws, each pair forming at one end, when brought together, a socket for receiving an end of one of said elongated members, and each jaw being provided near its other end with a recess facing a corresponding recess in the other jaw of the same pair,
   a rigid core having at least two polygonal surfaces bordered by adjacent edges which are bridged by elongated abutments extending longitudinally of said adjacent edges and projecting outwardly from the surfaces bordered by said edges, said abutments having opposed corners parallel to said surface edges,
   at least one fastener means connecting each pair of jaws, said fastener means being adjustable to clamp said one end of the pair of jaws connected thereby onto one of said elongated members and the other end of that pair of jaws onto one of said abutments,
   the recesses in each pair of opposed jaws being shaped to mate with the opposed corners on said abutments while said jaws and elongated members are positioned at an angle to both the surfaces bridged by said abutments.

2. A device as claimed in claim 1 in which said core is cubical.

3. A device as claimed in claim 1 in which said core is a tetrahedron.

4. A device as claimed in claim 1 in which said core has two identical flat surfaces, one edge of each surface being connected to a corresponding edge on the other surface by one of said abutments.

5. A device as claimed in claim 1 in which said abutments are polygonal in section.

6. A device as claimed in claim 1 in which said edges are curved.

References Cited

UNITED STATES PATENTS

| | | |
|---|---|---|
| 1,241,137 | 9/1917 | Mitchell. |
| 1,817,774 | 8/1931 | Sipe _____ 287—126 |

FOREIGN PATENTS

| | | |
|---|---|---|
| 17,137 | 5/1935 | Australia. |
| 214,128 | 3/1961 | Austria. |
| 1,325,679 | 3/1963 | France. |
| 829,390 | 3/1960 | Great Britain. |

EDWARD C. ALLEN, *Primary Examiner.*